United States Patent [19]

Baumann

[11] Patent Number: 4,528,471
[45] Date of Patent: Jul. 9, 1985

[54] POSITIONING SENSOR

[75] Inventor: Heinrich Baumann, Schwieberdingen, Fed. Rep. of Germany

[73] Assignee: Robert Bosch GmbH, Stuttgart, Fed. Rep. of Germany

[21] Appl. No.: 507,949

[22] Filed: Jun. 24, 1983

Related U.S. Application Data

[63] Continuation of Ser. No. 241,058, Mar. 6, 1981, abandoned.

[30] Foreign Application Priority Data

Mar. 27, 1980 [DE] Fed. Rep. of Germany ....... 3011822

[51] Int. Cl.³ ............................................ H02K 19/24
[52] U.S. Cl. ...................................... 310/11; 310/168
[58] Field of Search .............................. 310/111, 168; 324/170-173

[56] References Cited

U.S. PATENT DOCUMENTS

| | | | |
|---|---|---|---|
| 1,137,544 | 4/1915 | Severy et al. | 310/111 X |
| 3,602,750 | 8/1971 | Boyer | 310/168 |
| 3,619,680 | 11/1971 | Okamoto | 310/168 |
| 3,688,306 | 8/1972 | Oishi | 310/168 X |

Primary Examiner—Donovan F. Duggan
Attorney, Agent, or Firm—Frishauf, Holtz, Goodman & Woodward

[57] ABSTRACT

To provide association of a particular angular position of a gear, for example the starter gear of an internal combustion (IC) engine, with an inductive pick-up (10), at least one tooth (15) is made a marker tooth by relieving the end portion (15') over a portion (B1) of its width (B) for a predetermined portion (H1) of the height (H) of the tooth, leaving the remainder of the tooth at its normal height (H) so that operation of the gear is not impaired. The output signal derived from the pick-up will be distorted when the at least one tooth passes thereby, thus providing a reference pulse. The tooth (16, 18) adjacent the marker tooth (15, 17) can be likewise relieved, preferably to a lesser extent. Relief can be parallel to the end portion of the tooth, or at an angle of inclination, the relief of an adjacent tooth preferably being at an angle of inclination opposite that of the marker tooth.

7 Claims, 9 Drawing Figures

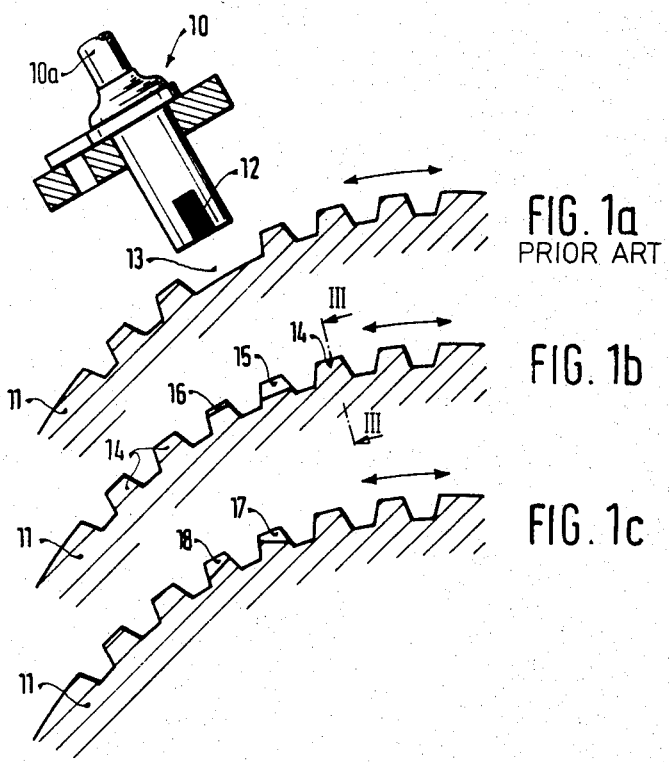
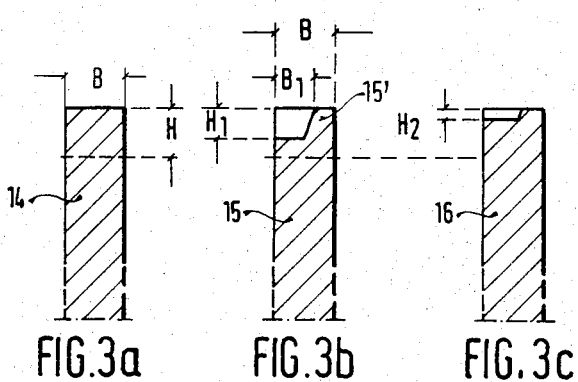

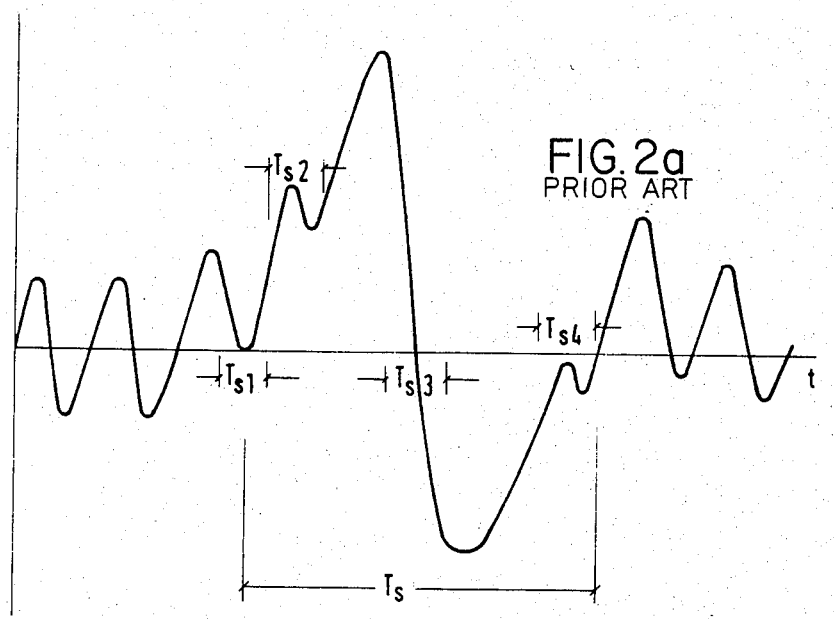
FIG. 2a
PRIOR ART
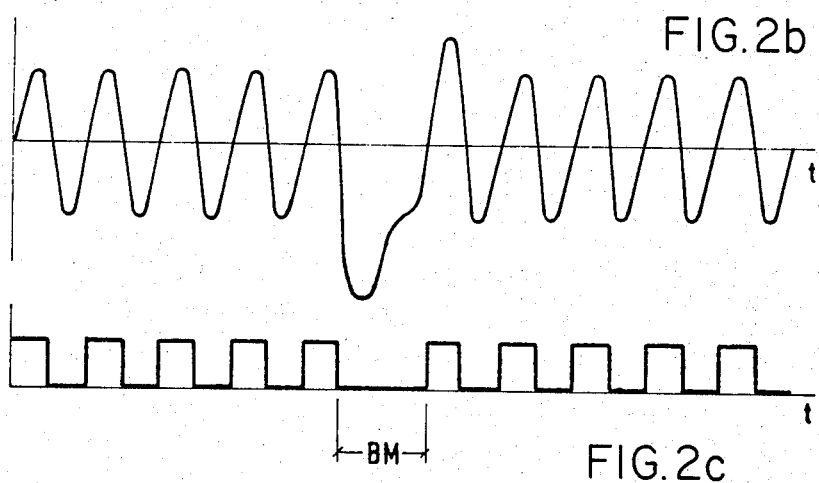
FIG. 2b
FIG. 2c

POSITIONING SENSOR

This application is a continuation of application Ser. No. 241,058, filed Mar. 6, 1981, now abandoned.

The present invention relates to a positioning sensor, and more particularly a sensor to determine the position of a movable machine element, especially a particular angular position of a gear, for example the starter gear in an internal combustion engine so that signals to control the timing of ignition pulses can be derived therefrom.

BACKGROUND

Magnetically inductive sensors to determine a predetermined position of a translatory or rotatably movable machine element are well known; such positioning sensors are used in many applications, and one particular application is the derivation of signals to determine the ignition timing or ignition instant in an Otto motor by passing a gear, for example the starter gear, of an internal combustion engine adjacent a magnetically inductive pick-up coil. Gears, of course, transmit mechanical, rotary power. Starter gears of internal combustion engines are mechanically loaded only during short intervals of their rotation, namely only during starting of the associated engine. The gears induce alternating signals. One or more of the gear teeth should, however, provide a signal which differs from that of other signals so that a reference or marker signal can be obtained. Reference marker signals generating apparatus are also used in machine tools, for example to determine a limit position. For use with internal combustion engines, it is desirable to use an already existing gear, for example the starter gear, and to place a magnetic pick-up coil adjacent the starter gear. The reference marker, related to a particular angular position of the starter gear, is then utilized to control ignition timing of an internal combustion engine.

A pulse source wich has an inductive pick-up coil placed adjacent a machine component is described, for example, in German Patent Disclosure Document DE-OS No. 25 32 226 to which U.S. Pat. No. 4,121,112 corresponds. The teeth induce essentially uniform signals in the pick-up coils; the material of a predetermined tooth or of predetermined teeth differs from that of the material of other teeth, so that, when the predetermined tooth or teeth pass by the pick-up coil, the induced voltage which results will have a phase position which is shifted with respect to the phase position of the voltage induced upon passage of the other teeth by a predetermined minimum value.

It is difficult to manufacture such a positioning system since making the gears or treating the gears so that a predetermined tooth, or teeth, has different material is expensive. Substantial machining time and effort is necessary to place teeth of different material in a gear. If the pulse source is used, for example, in combination with the starter gear of an internal combustion (IC) engine, placing of a special tooth of different material on the gear is difficult since the teeth of the gear are subjected to substantial mechanical loading.

THE INVENTION

It is an object to provide a positioning system in which a predetermined tooth, or predetermined teeth of a gear, provides signals which differ from the signals derived from the other teeth, which is simple to make and which does not require any specialized production step or steps that cannot be readily applied to the starter gear of an IC engine.

Briefly, the starter gear is so arranged that at least one tooth is formed at its end portion to be of lesser or reduced thickness with respect to the remainder of the tooth; looked at in an axial direction, or cross section, thus, the specific tooth for example has a portion of reduced height over a portion of its axial dimension, resulting in a relieved corner, for instance by cutting out, on a milling machine, a part of the end portion of a tooth.

The arrangement has the advantage that only minor changes have to be made on a tooth or on adjacent teeth of the starter gear, so that the overall machining required for the additional provision of a marker can be within the normal machining steps in making the starter gear. The weakening of the respective tooth or teeth is minor and, in general use, can be neglected. The additional cost of providing the marker tooth is minor.

DRAWINGS

FIG. 1a shows, in general arrangement, a marker system for an IC engine in which the starter gear is used to provide signals in a sensor arrangement, in accordance with the prior art;

FIG. 1b illustrates the tooth arrangement in accordance with one feature of the invention;

FIG. 1c is an axial view of another embodiment of the invention;

FIG. 2a is a graph of the signal derived from the structure of FIG. 1a;

FIG. 2b is a graph of the signal derived from the tooth arrangement of FIG. 1b;

FIG. 2c is a time graph of the signal of FIG. 2b after being wave-shaped into a digital square-wave signal;

FIG. 3a is an axial cross section of a full tooth of the starter gear of FIG. 1b;

FIG. 3b is an axial cross section of one form of a relieved tooth; and

FIG. 3c is an axial cross section of another form of the relieved tooth.

GENERAL STRUCTURE

A magnetic pick-up, for example as shown in German Patent DE-PS No. 24 10 630, is inductively coupled with a gear 11 such that the teeth of the gear 11 pass in close vicinity to the facing end of the pick-up 10. Pick-up 10 has an end pole 12.

The magnetic pick-up 10 provides a signal shown in FIG. 2a. The magnetic field due to the teeth 11 passing the pole shoe or pole end 12 changes. If the teeth 11 follow in sequential, uniform distance, i.e. are of uniform pitch and uniform gap—see FIG. 1a, a periodic signal can be derived from cable 10a of the pick-up 10. To generate a reference marker, that is, to generate a particular signal at a particular angular orientation of the gear 11, it is possible for example to leave off one of the teeth, forming a gap 13. The output signal derived from the pick-up 10 then will be, as shown in FIG. 2a, in which the gap is indicated by a non-uniformity of the signal, or a disturbance signal. As seen in FIG. 2a, the presence of the gap 13 also affects the signal picked up by the pick-up 10 by the adjacent teeth, that is, the teeth which are in advance of and behind the gap 13. An overall disturbance time $T_s$ will result which depends on the width of the air gap and the speed. In that period of time, the signals from the respective teeth, and hence information regarding the instantaneous angular position of the gear, can be lost. The critical time periods are $T_{s1}$, $T_{s2}$, $T_{s3}$, $T_{s4}$. These critical time periods are shown in FIG. 2a. The signals indicated at $T_{s2}$ and $T_{s4}$ are difficult to sense and can be masked by the much stronger signal due to the gap itself.

In accordance with the present invention, the influence of the leading or trailing tooth, with respect to the specific marker tooth, can be decreased by so forming the marker tooth that its axial thickness or width B (FIG. 3b) is reduced at the end portion thereof. A normal tooth, of standard thickness B is shown at 14 (FIG. 3a). The next adjacent tooth 15, see FIG. 3b, has its end portion 15' reduced over the portion $B_1$ of its width B by a certain height $H_1$. The projecting length of the tooth, beyond the inner diameter of the gear is shown at H (FIG. 3a). The next subsequent tooth 16 is also slightly reduced in height throughout a portion $B_1$ of its width B, although the reduction is less, see FIG. 3c, where tooth 16 is shown in axial cross section, similar to the cross section line III—III, FIG. 1b, with respect to tooth 14. The tooth preceding the tooth 15 could also be reduced similar to tooth 16.

The output signal from the magnetic pick-up 10, when the gear of FIG. 1b passes beneath the pick-up 10, is shown in FIG. 2b. As can be clearly seen, the influence of the reference marker tooth 15 extends, at least approximately, only over that angular portion in which the tooth 15 is opposite the pick-up 10. Upon waveshaping the signal, for example by passing the signal through a Schmitt-trigger, a digital signal of FIG. 2c is derived, having a clearly identified reference marker gap BM.

The sensor, thus, permits obtaining a precise output signal for each one of the normal teeth of the gear and a precise reference signal from a particular reference tooth.

The particularly shown reduction in width of tooth 15, 16, as seen in FIGS. 1b and 3b, 3c, is only one example. Different shapes of reduction in axial width of the end portion 15' of the tooth can be provided in accordance with various arrangements. For example, and referring to FIG. 1c, a reference tooth 17 as well as an adjacent tooth, as shown, a subsequent or preceding tooth 18—depending on the direction of rotation of the gear, see the double arrow—is obtained by cutting an inclined groove or slot off the axial end of the tooth. Thus, removed of material need not be parallel to a tangent of the tooth, but can be, as shown in FIG. 1c, at an inclination. Preferably, the angles of inclination of material removal are in opposite direction, as shown in FIG. 1c with reference to teeth 17, 18.

At least a portion of the tooth height H is retained over the entire width B of the tooth for the reference marker teeth 15, 17, so that the mechanical function of the gear 11 is not impaired. The weakening of the particular tooth is not serious in operation. The machining necessary is simple; material removed in accordance with FIGS. 1b, 1c, FIGS. 3b, 3c can be done readily by milling off an end portion of the respective tooth; additional machining time and costs are thus minor.

Various changes and modifications may be made, and features described in connection with one of the embodiments may be used with the other, within the scope of the inventive concept.

I claim:

1. Positioning sensor system to provide a plurality of electrical output signals representative of rotational speed of an automative starter gear for an internal combustion engine, and which is capable of transmitting rotary power to the engine, and an additional reference signal representative of the instant when the starter gear (4) has a predetermined angular position, said starter gear having a plurality of projecting teeth (14, 18), all of which are spaced from each other by uniform tooth gaps, and are of uniform pitch, so as to mesh with another mating gear, all of said teeth of said starter gear transferring power between said mating gear, said system further comprising a single electromagnetic inductive pick-up element (10, 12) positioned in magnetically coupled relation to the teeth of said starter gear, wherein the major number of teeth of said plurality of uniformly spaced teeth is of uniform shape and size, and at least one tooth (15, 17) being of reduced or lesser height (H1) over a portion (B1) of its axial dimension or width with respect to the teeth of uniform shape and size, to induce, during rotation of the starter gear, (i) uniformly similar electrical signals in the single inductive pickup element upon passage of said major number of teeth past the single inductive pickup element, and (ii) the additional reference signal in the inductive pickup element upon passage of said at least one tooth past said single electromagnetic inductive pick-up element, said additional reference signal being of different electrical characteristic from said uniformly similar electrical signals.

2. Positioning sensor system according to claim 1, in which a tooth (16, 18) adjacent said at least one tooth (15, 17) is of reduced or lesser height over a portion of its axial dimension or width with respect to the teeth of uniform shape (14) of the gear.

3. Positioning sensor system according to claim 2, wherein the decrease in height of the adjacent tooth (16) extends over a distance (H2) which is less than the reduction in height (H1) of said at least one tooth (15).

4. Positioning sensor system according to claim 1, wherein the decrease in height of said portion (B1) of the axial dimension or width extends at least approximately to the portion of the tooth which is unrelieved or of unreduced height.

5. Positioning sensor system according to claim 1, wherein the reduction in height at the end portion of said at least one tooth (15) extends at a predetermined angle with respect to the unrelieved or unreduced portion of said at least one tooth.

6. Positioning sensor system according to claim 2, wherein the reduction in height at the end portion of said at least one tooth (17) extends at a first predetermined angle with respect to the unrelieved or unreduced end portion of the tooth;

and wherein the reduction in height at the end portion of said adjacent tooth (18) extends at a second predetermined angle which is in a direction opposite to the first predetermined angle with respect to the unrelieved ior unreduced end portion of said adjacent tooth.

7. Positioning sensor system according to claim 1, wherein the reduction in height at the end portion of said at least one tooth (15) extends at a predetermined contour with respect to the unrelieved or unreduced end portion of the tooth.

* * * * *